United States Patent [19]
Nuckols

[11] 3,763,937
[45] Oct. 9, 1973

[54] AUXILIARY TOOL BAR LIFT MECHANISM
[75] Inventor: Philip H. Nuckols, Blytheville, Ark.
[73] Assignee: Paul Abbott Co., Inc., Blytheville, Ark.
[22] Filed: June 16, 1972
[21] Appl. No.: 263,493

[52] U.S. Cl. ................................ 172/311, 172/456
[51] Int. Cl. ............................................ A01b 49/00
[58] Field of Search ................... 172/126, 130, 456, 172/316, 311; 280/411–413

[56] References Cited
UNITED STATES PATENTS
| | | | |
|---|---|---|---|
| 3,669,195 | 6/1972 | Green et al. | 172/311 |
| 3,559,746 | 2/1971 | Couser | 172/456 X |
| 3,692,121 | 9/1972 | Kenney | 172/456 |
| 3,680,172 | 8/1972 | Couser | 172/456 X |
| 3,250,333 | 5/1966 | Day | 172/126 |
| 3,524,508 | 8/1970 | West | 172/126 |
| 3,650,333 | 3/1972 | Fueslein | 172/311 |
| 3,460,631 | 8/1969 | Friesen et al. | 172/311 |

Primary Examiner—Robert E. Pulfrey
Assistant Examiner—R. T. Rader
Attorney—A. Yates Dowell, Jr.

[57] ABSTRACT

Tool bar apparatus having a main portion supported by a mast hitch of a propelling vehicle and having at least one auxiliary portion swingably mounted on the main portion in such a manner as to provide maximum lateral movement of earth-working implements carried by the tool bar portions to accommodate various row spacings. The lift apparatus is fixed to the end of the main portion of the tool bar and swingably supports the auxiliary portion of the tool bar.

4 Claims, 7 Drawing Figures

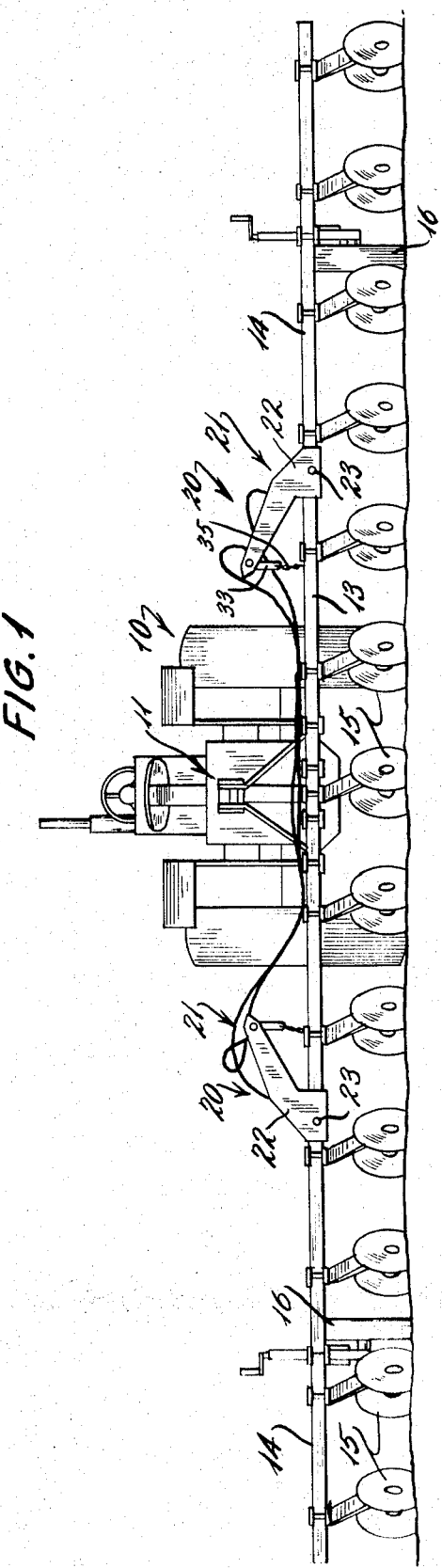

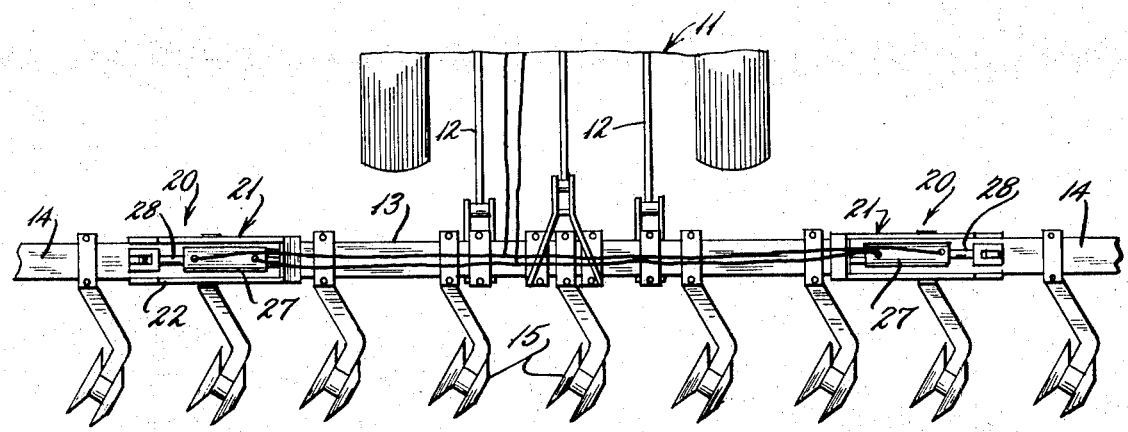
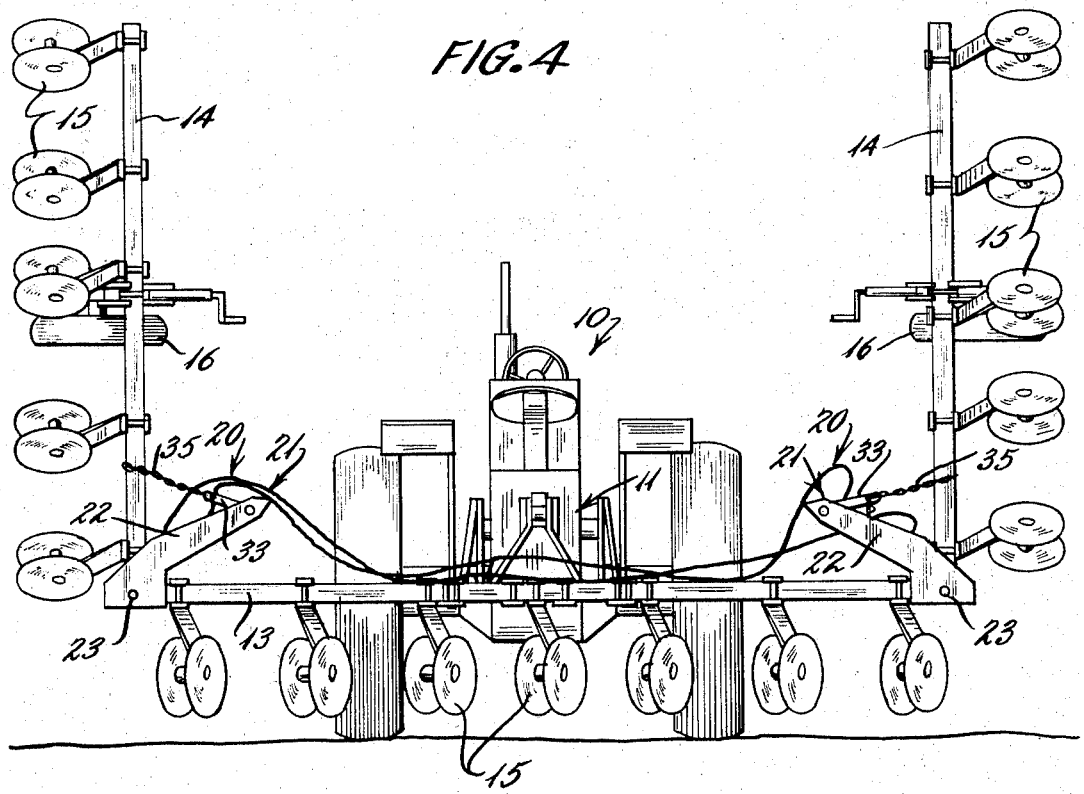

PATENTED OCT 9 1973 3,763,937

AUXILIARY TOOL BAR LIFT MECHANISM

BACKGROUND OF THE INVENTION

1. Field of the Invention

This invention relates generally to earth-working implements of various kinds and relates particularly to a tool bar, frame or other structure by which a plurality of earth-working implements are supported from a propelling vehicle.

2. Description of the Prior Art

Heretofore many tool bars or frames for supporting earth-working implements have been provided by means of which such implements could be moved into operating position in engagement with the earth, or raised to inoperative position above the earth when the surface over which the propelling vehicle was travelling was not to be engaged by the implements. Originally tool bars on which implements were mounted were limited in length and the number of implements which could be mounted thereon by the ability of the propelling vehicle to pull the implements through the earth, as well as by the restricted areas such as gates through which the vehicle travelled and roadways used for moving the vehicle and the implements from one location to another. When the available power of the propelling vehicles was increased so that they could pull more implements, the tool bars or supporting frames were provided with auxiliary tool bars or wings which extended beyond the main tool bar and which could be raised to a substantially vertical position so that a greater area could be covered but still permit the vehicle to pass through restricted areas.

In order to support the auxiliary tool bars in either fully extended position or in raised position, an upstanding connecting member has been mounted on one of the main or auxiliary tool bars while a fluid cylinder carried on some sort of bridge or framework has been mounted on the other member and the two have been connected by opposite ends of the fluid cylinder so that the auxiliary tool bar could be raised with a minimum of effort and time. The supporting of the auxiliary tool bar on the main tool bar and the mechanism by which the auxiliary tool bar is raised and lowered have presented many problems, particularly with respect to the location of the implements along the length of the tool bars.

Each crop being grown has an ideal spacing between rows which presents the best growing conditions for that particular crop, as well as the most efficient use of the land on which the crop is grown. Some implements, such as seeders and the like, are adapted to travel along the rows, while other implements such as cultivators are adapted to travel in the area between rows. Various row spacings for the implements have not been a particular problem in the central portion of the tool bar. However, the structure for supporting and raising auxiliary tool bars has presented an obstruction at the ends of the main tool bar and as a result the rows have been located too close together for ideal growing conditions, or have been spaced too far apart for the most efficient use of the available land.

Some examples of prior art lifting devices for tool bars as welll as for row markers are the patents to Day No. 3,250,333; Groenke No. 3,255,830; Stinemetz No. 3,520,373; Parker No. 3,521,906; West No. 3,524,508; and Hook No. 3,568,777.

SUMMARY OF THE INVENTION

The present invention is an auxiliary tool bar lift mechanism including a frame mounted on at least one end of a main tool bar and providing a support for an auxiliary tool bar. The frame extends upwardly and inwardly toward the middle of the main tool bar and is adapted to support one end of a fluid cylinder which has a piston rod connected to an upstanding lug on the auxiliary tool bar. The frame is provided with stop means against which the auxiliary tool bar is adapted to rest when in raised inoperative position, and means is provided for locking the auxiliary tool bar in raised position. The frame engages the tool bar only in the area of the swinging connection between the main and auxiliary tool bars.

It is an object of the invention to provide a lift mechanism for swingably connecting an auxiliary tool bar to a main tool bar and in which the lift mechanism engages the main and auxiliary tool bars only in the area where such tool bars are adjacent to each other.

BRIEF DESCRIPTION OF THE DRAWINGS

FIG. 1 is a rear elevation of the device in use on relatively flat terrain.

FIG. 2 is a rear elevation of the device in use on uneven terrain.

FIG. 3 is a top plan view.

FIG. 4 is a rear elevation with the auxiliary tool bars in raised position.

DESCRIPTION OF THE PREFERRED EMBODIMENT

Figure 5:
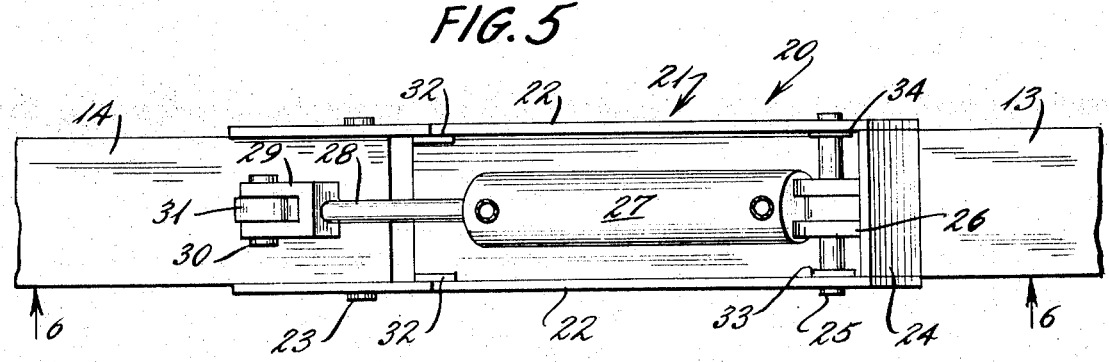
FIG. 5 is a top plan view of the lift mechanism.

With continued reference to the drawings, a propelling vehicle 10 is provided with a conventional mast hitch 11. The mast hitch 11 has lift arms 12 connected to a main tool bar 13 by either a two-point or a three-point connection, as is well known in the art. The lift arms 12 are adapted to raise and lower the main tool bar 13 either parallel to the ground or at an angle thereto.

An auxiliary tool bar 14 is swingably connected to at least one end of the main tool bar and, as illustrated, an auxiliary tool bar is swingably connected at each end of the main tool bar 13. Each of the main and auxiliary tool bars is adapted to support a plurality of earth-working implements 15 in such a manner that the implements can be shifted axially of the tool bar so that the implements can be located in a desired position to engage the earth in accordance with a desired row spacing. Preferably the auxiliary tool bars 14 also have gauge wheels 16 mounted thereon to regulate the depth of penetration of the implements carried by the auxiliary tool bars. The depth of penetration of the implements carried by the main tool bar is controlled by the operator of the vehicle by raising and lowering the lift arms 12.

In order to swingably mount the auxiliary tool bars 14 on the main tool bar 13, as well as to raise and lower the auxiliary tool bars, a lift mechanism 20 is provided and such lift mechanism includes a frame 21 having sides 22 welded or otherwise permanently fixed to the main tool bar 13 adjacent to the ends thereof. Substantially in alignment with the main tool bar 13, a pivot 23 is carried by the sides 22 and the auxiliary tool bars 14 are mounted on such pivots at opposite ends of the main tool bar in such a manner that when the auxiliary tool bars are extended, the main and auxiliary tool bars are substantially coplanar.

Figure 6:
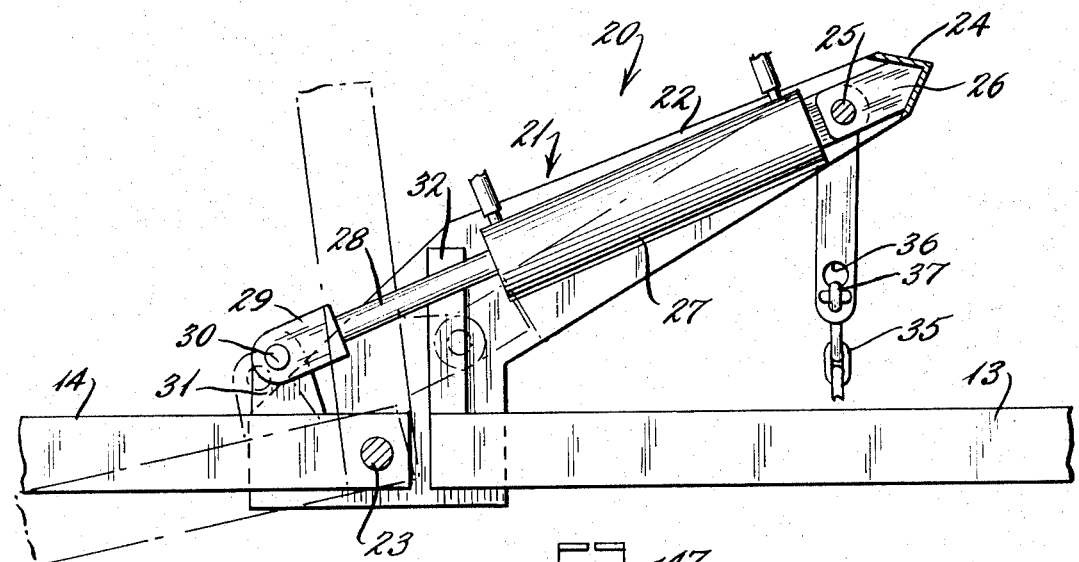
FIG. 6 is a section on the line 6—6 of FIG. 5.

The sides 22 extend upwardly and inwardly toward the center of the main tool bar so that the free ends are in spaced overlying position relative to the main tool bar. As illustrated in FIGS. 5 and 6, the free ends of the sides 22 are connected by one or more end plates 24 for imparting strength and rigidity to the sides 22.

Adjacent to the free ends of the frame 21, a pivot pin 25 is provided and such pin extends through a pair of ears 26 fixed to the end plate 24 between the sides 22. Between the ears 26, one end of a fluid cylinder 27 is swingably mounted on the pivot pin 25 and such fluid cylinder includes a piston rod 28 having a yoke or clevis 29 at its outer end. The yoke 29 is connected by a pin 30 to a lug 31 extending upwardly from the upper surface of the auxiliary tool bar 14. The lug 31 is spaced outwardly from the pivot 23 so that extension and retraction of the piston rod 28 causes the auxiliary tool bar to swing about the pivot 23.

With reference to FIGS. 5 and 6, each of the sides 22 is provided with an inwardly extending stop 32 against which the auxiliary tool bar is adapted to rest when such tool bar is in a substantially vertical position. In order to secure the auxiliary tool bars in raised position, a pair of links 33 and 34 are swingably mounted on the pivot pin 25 on opposite sides of the ears 26. A chain 35 is welded or otherwise fixed to the link 33 and such chain is adapted to extend around the auxiliary tool bar 14 and be connected to the link 34. The chain 35 can be connected to the link 34 in any quickly releasable manner; however, as illustrated, the link 34 is provided with an opening 36 having a key slot 37. The free end of the chain 35 is adapted to be inserted through the opening 36 and one of the links is inserted in the key slot 37 to hold the chain in position. When the chain 35 is applied to the auxiliary tool bar 14, such tool bar cannot accidentally be lowered.

Figure 7:
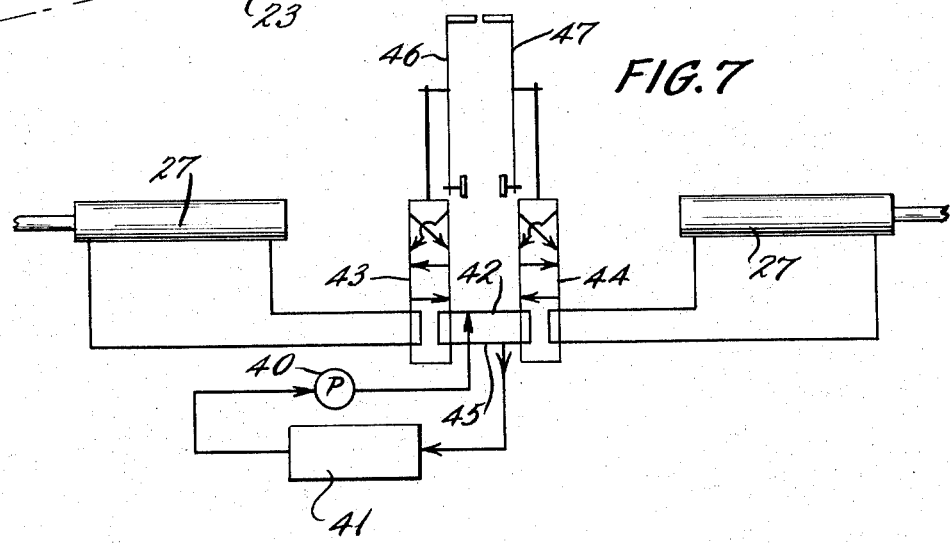
FIG. 7 is a schematic of the hydraulic system of the lift mechanism.

With reference to FIG. 7, each of the fluid cylinders 27 can be operated independently or simultaneously. As illustrated, a fluid pump 40 of the vehicle hydraulic system pumps fluid from a reservoir 41 to a pressure header 42 which supplies fluid under pressure to distributor valves 43 and 44 and such valves are connected to a discharge header 45 which returns fluid to the reservoir. The distributor valves 43 and 44 are controlled by levers 46 and 47, respectively, located adjacent to the operator. When the auxiliary tool bars are in fully extended position, the distributor valves 43 and 44 are in neutral position, as shown in FIG. 7, in which no fluid is being pumped to the cylinders, and the auxiliary tool bars can freely swing about the pivot 23 so that the implements carried by the tool bars follow the contour of the earth, as illustrated in FIGS. 1 and 2. When it is desired to raise the auxiliary tool bars, the distributor valves 43 and 44 are moved so that fluid under pressure is introduced into the outer end of each of the cylinders to retract the piston rods 28 and cause the auxiliary tool bars 14 to swing upwardly about the pivots 23. From the raised position, the auxiliary tool bars 43 can be lowered to operating position by introducing fluid into the inner ends of the cylinders 27.

It is clear from FIGS. 1, 2 and 4 that the main tool bar 13 and each of the auxiliary tool bars 14 are free of obstructions for most of their lengths and therefore the implements 15 can be freely adjusted to accommodate substantially any row spacing.

In the operation of the device, when the auxiliary tool bars 14 are in extended position, the main and auxiliary tool bars are substantially coplanar. However, the auxiliary tool bars are free to swing about the pivots 23 so that they follow the contour of the earth. When it is necessary to raise the auxiliary tool bars, the operator of the vehicle shifts the distributor valves 43 and 44 to introduce fluid under pressure into the outer ends of the cylinders 27 and cause the auxiliary tool bars to swing upwardly. The stops 32 limit the movement of the auxiliary tool bars, although it is not essential that the auxiliary tool bars engage the stops except when the main tool bar is to be disconnected from the propelling vehicle. To lower the auxiliary tool bars, the distributor valves 43 and 44 are shifted to introduce fluid under pressure into the inner ends of the cylinders 27 to cause the piston rods 28 to be extended and swing the auxiliary tool bars downwardly about the pivots 23. Either auxiliary tool bar can be raised independently of the other if a large boulder, tree or other obstruction is in its path of movement by operating the appropriate lever 46.

It is noted that although the sides 22 have been illustrated and described as being fixed to the ends of the main tool bar, it is obvious that such sides could be welded or otherwise attached to the auxiliary tool bars, and the pivots 23 and upwardly extending lugs 31 could be carried by the main tool bar.

I claim:

1. Apparatus for swingably connecting first and second tool bars, comprising a first tool bar for supporting a plurality of implements, an elongated frame connected to one end of said first tool bar and having a portion extending outwardly beyond the same in a plane generally parallel to the axis of said first tool bar, a second tool bar for supporting a plurality of implements, means for pivotally mounting one end of said second tool bar on said outwardly extending portion of said frame so that the end of the second tool bar is contiguous to the end of the first tool bar and the tool bars normally are disposed in coextensive relationship but permit movement of one tool bar relative to the other, said frame extending away from the contiguous ends of said tool bars, power means carried by said frame, said power means being connected to said second tool bar adjacent to the outwardly extending portions of said frame, and said frame engaging said first and second tool bars adjacent to their contiguous ends only, whereby implements carried by said tool bars can be located in a selected position along the lengths of said tool bars and operation of said power means moves one of said tool bars relative to the other.

2. The structure of claim 1 in which said power means includes a fluid cylinder having a piston rod connected to said second tool bar.

3. The structure of claim 1 including stop means to limit movement of said movable tool bar, and means for holding said second tool bar against said stop means.

4. Apparatus for swingably connecting a main tool bar to an auxiliary tool bar, each of the tool bars supporting a plurality of earth-working implements in selected positions, said apparatus comprising an elongated frame connected to one end of the main tool bar and having a portion extending outwardly beyond the same in a plane generally parallel to the axis of the main tool bar, means for pivotally mounting one end of the auxiliary tool bar on said outwardly extending portion of said frame so that the end of the auxiliary tool bar is contiguous to the end of the main tool bar and the main and auxiliary tool bars normally are disposed substantially in coextensive relationship with each other, said frame extending away from the contiguous ends of the tool bars in a plane along the axis of said main tool bar to a position spaced from and overlying the main tool bar, fluid cylinder means swingably carried by said frame, lug means mounted on the auxiliary tool bar adjacent to the outwardly extending portions of said frame, said fluid cylinder means being connected to said lug means, means for operating fluid cylinder means, and said frame engaging the main and auxiliary tool bars adjacent to their contiguous ends only so that implements carried by said main and auxiliary tool bars are freely movable to selected positions along the lengths of the same and operation of said fluid cylinder means causes the auxiliary tool bar to swing about the pivotal mounting on said frame.

* * * * *